(12) United States Patent
Tamekuni et al.

(10) Patent No.: US 9,360,633 B2
(45) Date of Patent: Jun. 7, 2016

(54) METHOD FOR ASSEMBLING OPTICAL CONNECTOR

(75) Inventors: Yoshikyo Tamekuni, Chigasaki (JP); Yuji Suzuki, Chigasaki (JP); Yukihiro Yokomachi, Yokohama (JP)

(73) Assignees: SEI OPTIFRONTIER CO., LTD., Kanagawa (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 498 days.

(21) Appl. No.: 13/978,174

(22) PCT Filed: Dec. 14, 2011

(86) PCT No.: PCT/JP2011/078852
§ 371 (c)(1),
(2), (4) Date: Jul. 3, 2013

(87) PCT Pub. No.: WO2012/093566
PCT Pub. Date: Jul. 12, 2012

(65) Prior Publication Data
US 2013/0276290 A1    Oct. 24, 2013

(30) Foreign Application Priority Data

Jan. 6, 2011 (JP) ................................. 2011-001452

(51) Int. Cl.
*H01R 43/00*  (2006.01)
*G02B 6/38*  (2006.01)

(52) U.S. Cl.
CPC ......... *G02B 6/3833* (2013.01); *Y10T 29/49826* (2015.01)

(58) Field of Classification Search
CPC .. G02B 6/3893; G02B 6/3869; G02B 6/3855; G02B 6/3834; Y10T 29/49826

USPC ........... 29/857, 428, 862, 868, 874, 876, 881; 385/53, 60, 69, 95, 96, 97, 98
See application file for complete search history.

(56) References Cited

U.S. PATENT DOCUMENTS 8,047,726 B2 * 11/2011 Tamekuni ............ G02B 6/3846
    385/53
8,480,314 B2 * 7/2013 Saito .................... G02B 6/3862
    385/95

FOREIGN PATENT DOCUMENTS

JP    2002-082257 A    3/2002

OTHER PUBLICATIONS

Hikari Tsushin Gijutsu Handbook, 1st edition, Optronics, Jan. 30, 2002, p. 251.
Nobuo Suzuki et al., Ceramic capillary connector for 1.3 μm single-mode fibres, Electronics Letters, Dec. 6, 1979, vol. 15, No. 25, p. 809-810.
JIS Handbook, 22 Electronics II Optoelectronics, first edition, edited and published by Japanese Standards Association, published Jan. 31, 2005, pp. 312-339 with an English translation of p. 322.

* cited by examiner

*Primary Examiner* — Thiem Phan
(74) *Attorney, Agent, or Firm* — Global IP Counselors, LLP (57) ABSTRACT

To provide a method for assembling an optical connector with which the optical connector can be easily assembled. An optical connector is assembled by preparing a holding cap that holds a frame member and a plug housing while maintaining a relative positional relationship between the frame member and the plug housing, inserting a ferrule into the frame member, and connecting the plug housing and the rear housing to each other.

4 Claims, 12 Drawing Sheets

METHOD FOR ASSEMBLING OPTICAL CONNECTOR

CROSS-REFERENCE TO RELATED APPLICATIONS

This U.S. National stage application claims priority under 35 U.S.C. §119(a) to Japanese Patent Application No. 2011-001452, filed in Japan on Jan. 6, 2011, the entire contents of which are hereby incorporated herein by reference.

TECHNICAL FIELD

The present invention relates to a method for assembling an optical connector.

BACKGROUND ART

JIS handbook, 22 Electronics II Optoelectronics, first edition, edited and published by Japanese Standards Association, published Jan. 31, 2005, p. 322 (NPTL 1) describes an optical connector including a ferrule that holds an optical fiber, a ferrule assembly including the ferrule, a frame member that contains the ferrule assembly, a plug housing that contains the frame member and that is to be connected to an adapter, and a rear housing that is connected to the plug housing and through which an optical fiber is inserted.

Recently, optical connectors have been assembled at work sites outside dedicated factories. Japanese Unexamined Patent Application Publication No. 2002-82257 (PTL 1) discloses an optical connector that can be assembled at a work site. In this optical connector, a short optical fiber having a polished end face and inserted through a ferrule is fusion-spliced to another optical fiber, and the fusion-spliced portion is reinforced by being covered with a reinforcing member.

In the optical connector described in NPTL 1, the plug housing and the frame member are attached to the rear housing in that order. Although the plug housing can be easily connected to the rear housing, the frame member must be inserted into and fixed to the rear housing while allowing the ferrule to be inserted into the frame member and positioning the frame member. Therefore, when the optical connector described in NPTL 1 is assembled at a work site, the optical connector preferably has the structure described in PTL 1 from the viewpoint of workability. However, the frame member of such an optical connector cannot be easily attached, and there is a problem in that it is cumbersome and takes a long time to assemble the optical connector at a work site.

SUMMARY OF INVENTION

Technical Problem

An object of the present invention is to provide a method for assembling an optical connector with which the optical connector can be easily assembled.

Solution to Problem

To achieve the above-described object, a method for assembling an optical connector is provided, the optical connector including a ferrule assembly including a ferrule that holds an embedded fiber, a frame member that contains the ferrule assembly, a first housing that is to be connected to an adapter and that contains the frame member, and a second housing that is connected to the first housing and through which an optical fiber connected to the embedded fiber is inserted. This method includes (1) a step of holding the frame member and the first housing with a holding member while maintaining a relative positional relationship between the frame member and the first housing; and (2) a step of inserting the ferrule into the frame member and connecting the first housing and the second housing to each other while the frame member and the first housing are held by the holding member.

In the holding step, preferably, the first housing is arranged so as to contain the frame member and threadably engaged with the holding member after the frame member is inserted into a through hole formed in the holding member, and the frame member and the first housing are held by the holding member such that central axes of the frame member and the first housing coincide with each other. In this case, preferably, the holding member has an inner diameter that is substantially equal to an outer diameter of a tubular portion of the frame member at a ferrule insertion side and, in the holding step, the frame member is held by the holding member in a slidable manner. Preferably, the method further includes a step of attaching a protective cap to the ferrule and, in the step of connecting the first housing and the second housing to each other, the protective cap attached to the ferrule is inserted through the through hole.

Advantageous Effects of Invention

According to the present invention, the optical connector can be easily assembled. As a result, the workability can be improved.

DESCRIPTION OF EMBODIMENTS

An embodiment of the present invention will now be described with reference to the drawings. The drawings are for illustrative purposes, and are not intended to limit the scope of the invention. To avoid redundancy of explanation, the same components are denoted by the identical reference numerals in the drawings. The dimensional ratios in the drawings are not necessarily exact.

Figure 1:
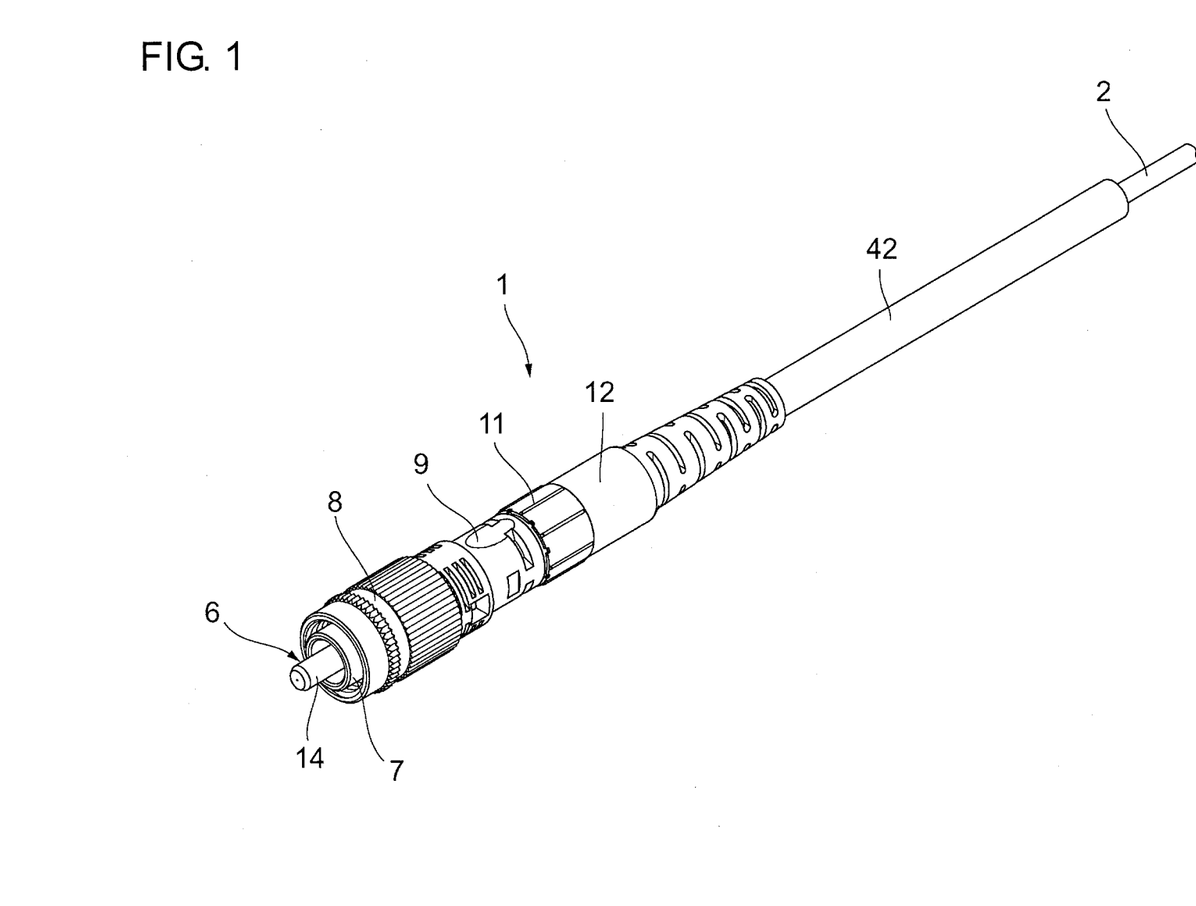
FIG. 1 is a perspective view of an optical connector assembled by a method for assembling an optical connector according to the present invention.
Figure 2:
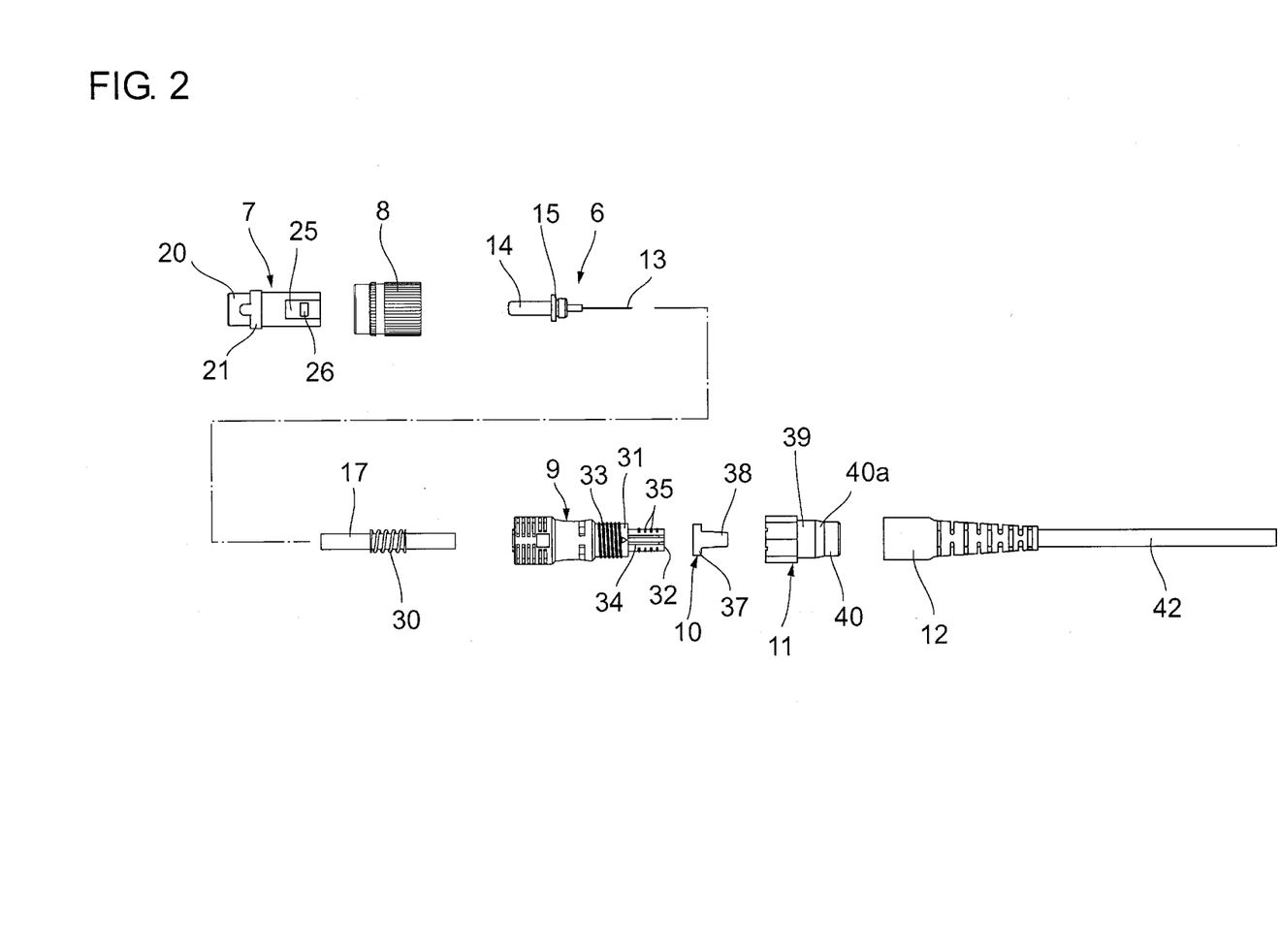
FIG. 2 is an exploded view of the optical connector illustrated in FIG. 1.
Figure 3:
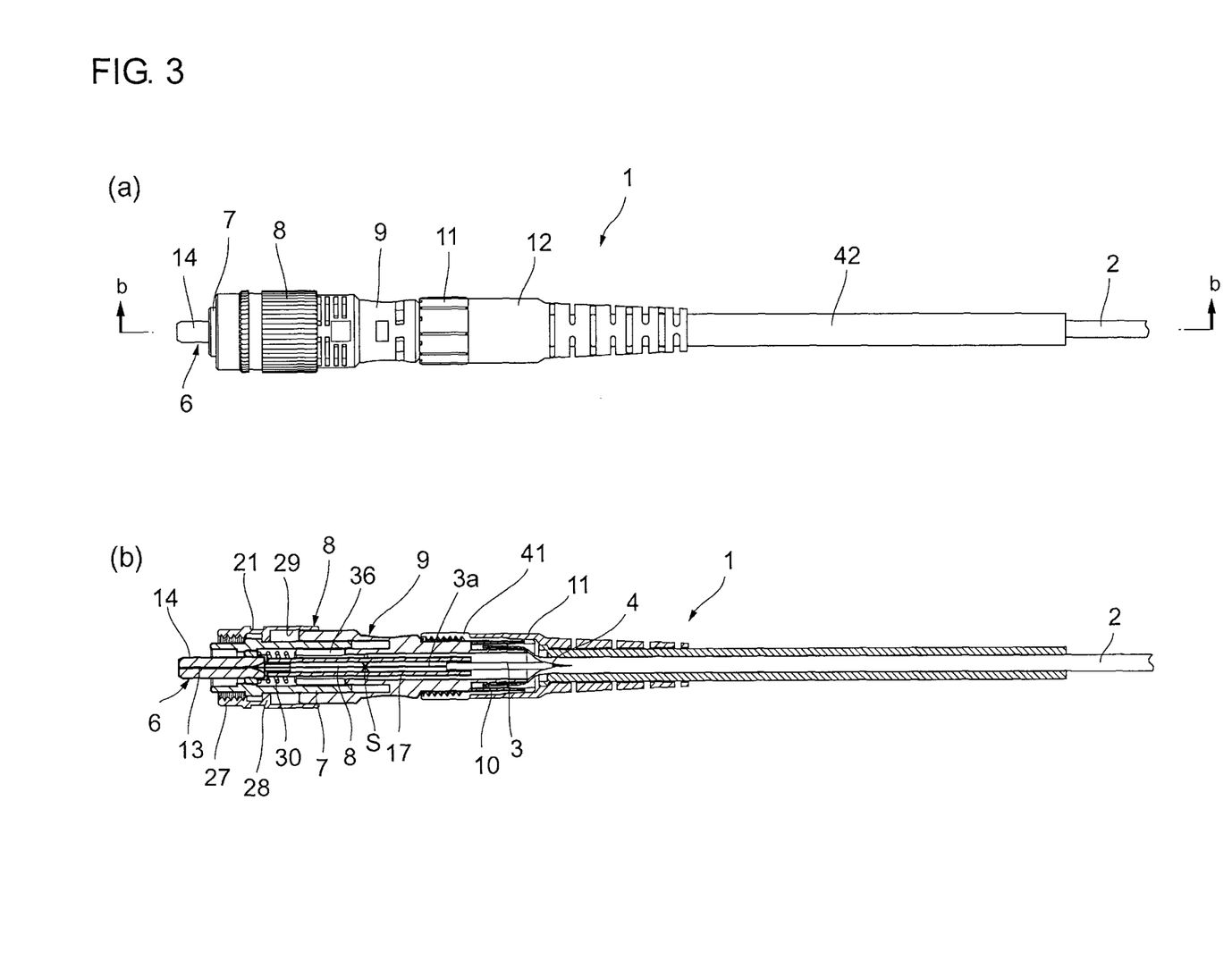
FIG. 3(a) is a side view of the optical connector illustrated in FIG. 1
FIG. 3(b) is a sectional view taken along line b-b in FIG. 3(a).

FIG. 1 is a perspective view of an optical connector 1 assembled by a method for assembling an optical connector according to the present invention. FIG. 2 is an exploded view of the optical connector 1. FIG. 3(a) is a side view of the optical connector 1. FIG. 3(b) is a sectional view taken along line b-b in FIG. 3(a).

Figure 4:
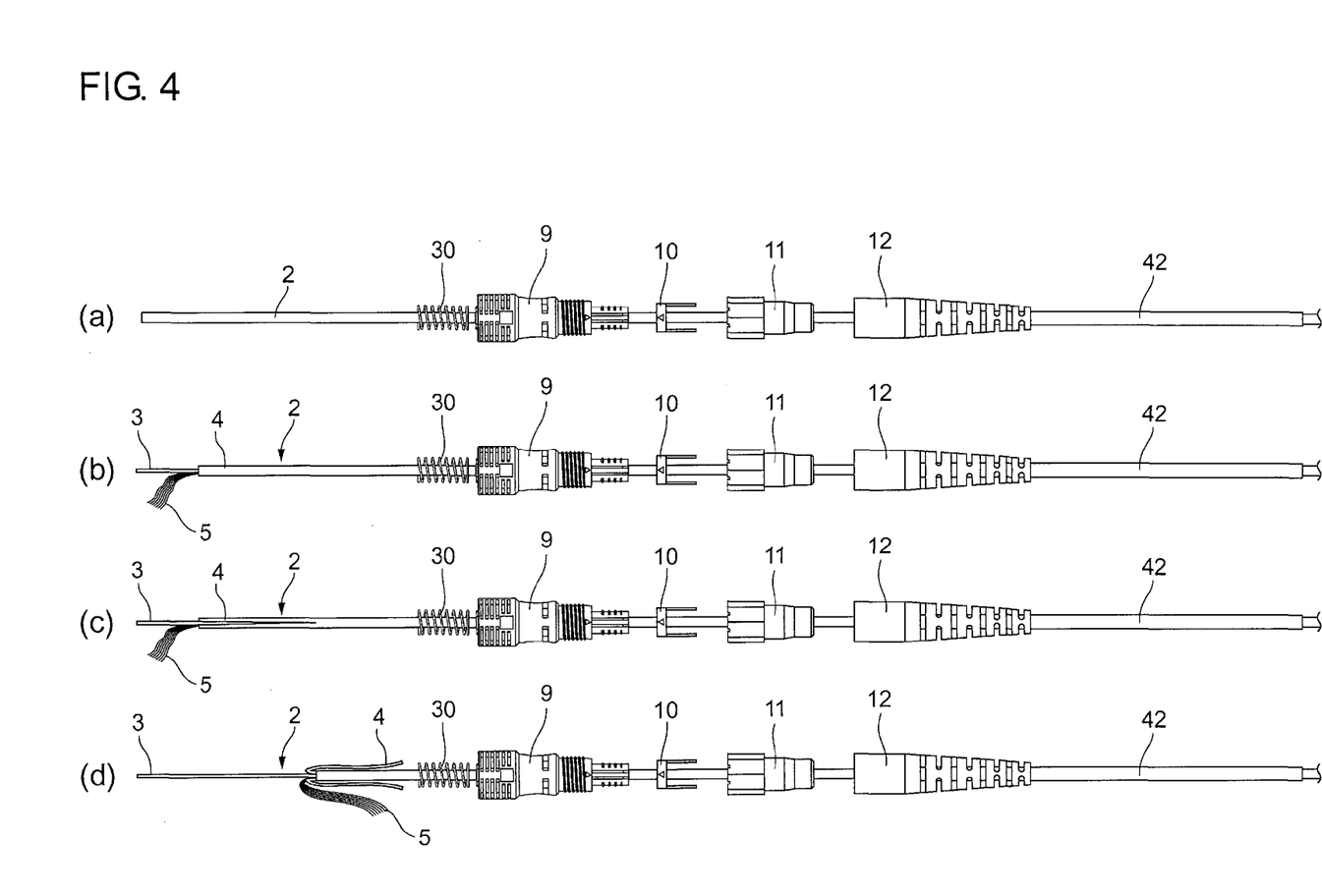
FIG. 4 is a conceptual diagram illustrating a method for assembling an optical connector according to an embodiment of the present invention.

The optical connector 1 is a cord-type FC connector to which an optical cord 2 is assembled. The optical cord 2 includes an optical fiber 3, a jacket 4 that covers the optical fiber 3, and tensile resistant fibers (Kevlar) 5 (FIG. 4) that are very thin and that are interposed between the optical fiber 3 and the jacket 4. The tensile resistant fibers 5 are contained in the optical cord 2 while being collected in the form of a bundle.

The optical connector 1 includes a ferrule assembly 6; a frame member 7 that contains the ferrule assembly 6; a plug housing (first housing) 8 that contains the frame member 7 and that is to be connected to an FC-type adapter; a rear housing (second housing) 9 that is connected to a rear end of the plug housing 8; a jacket retaining member 10 and a securing member 11 that are attached to the rear housing 9; and a boot 12 that is attached to the securing member 11.

The ferrule assembly 6 includes a ferrule 14 that holds a short embedded fiber 13 and a flange portion 15 fixed to the ferrule 14. The embedded fiber 13 extends rearward from the ferrule assembly 6 by a predetermined length. A rear end of the embedded fiber 13 is fusion-spliced to an end of the optical fiber 3 that is exposed by removing a portion of the jacket 4 at an end of the optical cord 2. A fusion-spliced portion S between the embedded fiber 13 and the optical fiber 3 is protected by a fusion protection sleeve 17 (see FIG. 5).

Figure 5:
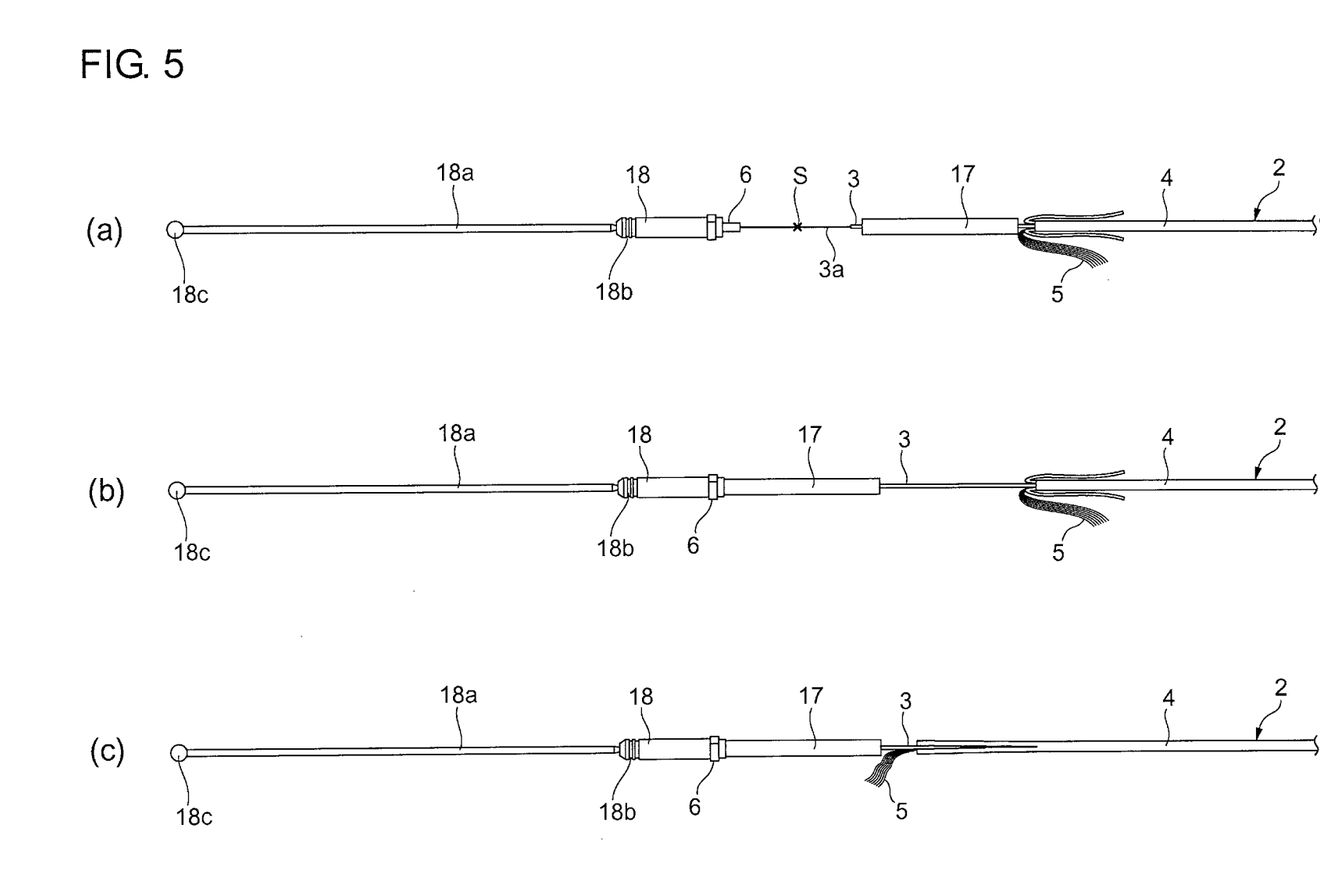
FIG. 5 is a conceptual diagram illustrating the method for assembling an optical connector according to the embodiment of the present invention.

When the optical connector 1 is not used (when the optical connector 1 is not connected to another optical connector), the ferrule 14 is covered with a dust cap (protective cap) 18 for protecting the ferrule 14 from dust and the like (see FIG. 5). The dust cap 18 has a substantially cylindrical shape. The dust cap 18 is formed of, for example, a thermally stable plastic that does not melt or soften at a high temperature, such as 200° C. An irregular-shaped portion 18b that prevents slipping is formed on an outer peripheral surface of a front portion of the dust cap 18.

Figure 7:
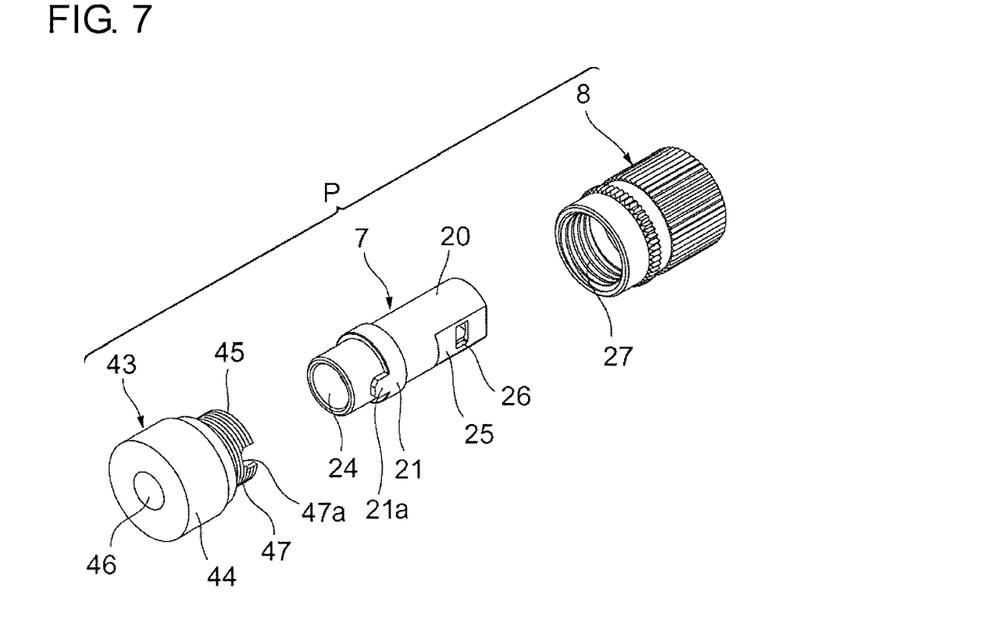
FIG. 7 is an exploded perspective view of a provisionally assembled unit.

The frame member 7 is hollow and contains the ferrule assembly 6. The frame member 7 includes a tubular portion 20 that has a cylindrical shape and an annular retaining portion 21 formed on an outer surface of the tubular portion 20 (FIG. 7). The tubular portion 20 has a through hole 24 through which the ferrule assembly 6 is inserted. A pair of flat portions 25 are formed on a rear part of the tubular portion 20, and a pair of holes 26 are formed in the respective flat portions 25. The retaining portion 21 has a projection 21a.

The plug housing 8 has a cylindrical shape, and can be connected to an FC-type adapter (connector). A female screw 27 is formed on an inner peripheral surface of a front part of the plug housing 8 (FIG. 7). The female screw 27 is threadably engageable with a male screw formed on an FC-type adapter (not shown).

As illustrated in FIG. 3(b), an insertion portion 29 into which a front end of the rear housing 9 is inserted is formed in a rear part of the plug housing 8. An annular protruding portion 28 that protrudes inward is formed on the inner surface of the plug housing 8. The protruding portion 28 is retained between the retaining portion 21 of the frame member 7 that is fixed to the rear housing 9 and the rear housing 9, so that the plug housing 8 is retained.

A spring 30 is disposed between the flange portion 15 of the ferrule assembly 6 and the rear housing 9. The spring 30 is disposed between the flange portion 15 of the ferrule assembly 6 and the rear housing 9 in a compressed state. The spring 30 is means for urging the ferrule assembly 6 forward. Owing to the spring 30, a physical contact (PC) connection with an FC-type adapter can be achieved.

The rear housing 9 includes a large tubular portion 31 and a small tubular portion 32 that is provided behind the large tubular portion 31. The diameter of the small tubular portion 32 is smaller than the diameter of the large tubular portion 31. A male screw 33 is formed on an outer peripheral surface of the large tubular portion 31.

A pair of guide rails 34 for guiding the jacket retaining member 10 are formed on an outer peripheral surface of the small tubular portion 32 so as to extend in the front-rear direction. In addition, blade portions 35 for securing the jacket 4 of the optical cord 2 are also formed on the outer peripheral surface of the small tubular portion 32.

Figure 9:
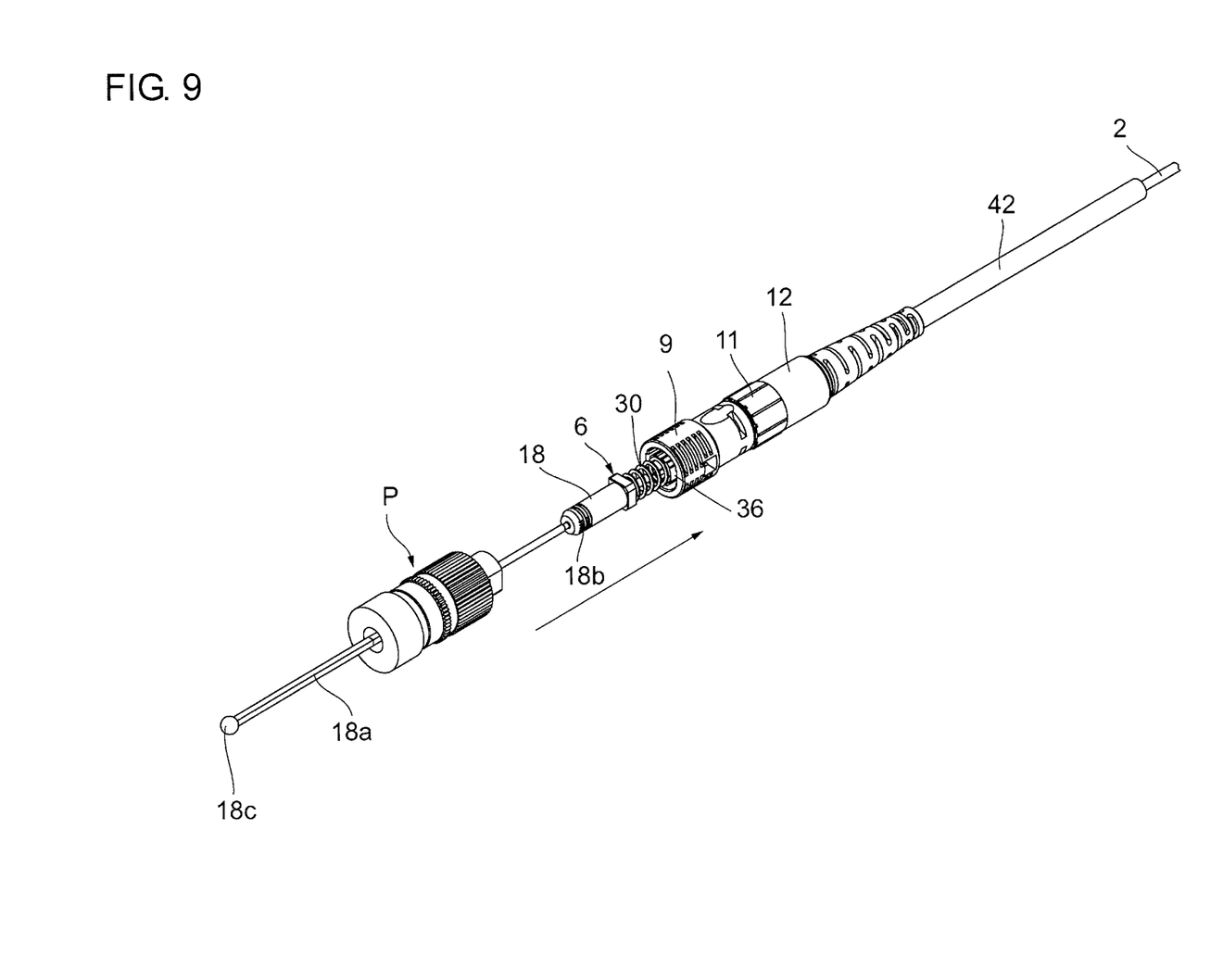
FIG. 9 is a conceptual diagram illustrating the method for assembling an optical connector according to the embodiment of the present invention.

The rear housing 9 includes an insertion portion 36 that is inserted through the through hole 24 in the frame member 7 (see FIG. 9). Lug portions (not shown) that can be fitted to the holes 26 in the frame member 7 are provided on an outer peripheral surface of the insertion portion 36. The frame member 7 is fixed and connected to the rear housing 9 when the lug portions are fitted into the holes 26. The spring 30 contacts an end face of the insertion portion 36.

The jacket retaining member 10 and the securing member 11 are attached to the rear housing 9. The jacket retaining member 10 includes an annular portion 37 that is fitted to the small tubular portion 32 and a pair of retaining arms 38 that are integrated with the annular portion 37 and extend in the axial direction of the annular portion 37. A pair of projections (not shown) that engage with the respective guide rails on the small tubular portion 32 are formed on an inner peripheral surface of the annular portion 37.

The securing member 11 has a substantially tubular shape. The securing member 11 includes a tensile-resistant-fiber securing portion 39 that secures the tensile resistant fibers 5 (see FIG. 6) of the optical cord 2 to the large tubular portion 31 of the rear housing 9 and a jacket securing portion 40 that is provided behind the tensile-resistant-fiber securing portion 39 and that secures the jacket 4 of the optical cord 2 to the small tubular portion 32 of the rear housing 9 with each of the retaining arms 38. A female screw 41 that threadably engages with the male screw 33 of the large tubular portion 31 is formed on an inner peripheral surface of the tensile-resistant-fiber securing portion 39. A predetermined clearance is provided between the male screw 33 and the female screw 41 so that the tensile resistant fibers 5 can be sandwiched between the large tubular portion 31 and the tensile-resistant-fiber securing portion 39. The jacket securing portion 40 has a tapered region 40a in which the thickness of the jacket securing portion 40 decreases toward the rear end of the securing member 11. Therefore, an opening diameter of the securing member 11 at the rear end is smaller than an opening diameter (outer diameter of the jacket retaining member 10) of the securing member 11 at the front end.

A boot 12 is attached to the jacket securing portion 40. The boot 12 protects the optical cord 2 by preventing the optical cord 2 from being sharply bent in a region behind the rear housing 9. A reinforcing tube 42 is attached to the boot 12 in advance.

Next, a procedure (method) for assembling the optical connector 1 will be explained. FIGS. 4, 5, 6, 9, 10, and 11 are conceptual diagrams illustrating a method for assembling an optical connector according to an embodiment of the present invention. First, the spring 30, the rear housing 9, the jacket retaining member 10, the securing member 11, and the boot 12 are arranged in order and the optical cord 2 is inserted through these components from the rear (from the reinforcing tube 42) (FIG. 4(a)). A portion of the jacket 4 at an end of the optical cord 2 is removed so that the optical fiber 3 and the tensile resistant fibers 5 are exposed (FIG. 4(b)). An end portion of the jacket 4 is cut into two bifurcated portions (FIG. 4(c)). Then, the bifurcated portions of the jacket 4 and the tensile resistant fibers 5 are folded back (FIG. 4(d)).

Subsequently, the optical fiber 3 is inserted through the fusion protection sleeve 17. Then, a portion of a coating of the optical fiber 3 at an end of the optical fiber 3 is removed so that a bare fiber 3a is exposed, and the bare fiber 3a is cleaned. Subsequently, the end portion of the optical cord 2 is set to a fusion fiber holder (not shown). Then, an end portion of the bare fiber 3a is cut. After that, the fusion fiber holder is set to a fusion splicer (not shown). Subsequently, the ferrule assembly 6 in which the dust cap 18 with a shaft is attached to the ferrule 14 is prepared, and is set to a ferrule holder (not shown). Then, the ferrule holder is set to the fusion splicer (not shown). After that, an end of the embedded fiber 13 and the end of the bare fiber 3a of the optical fiber 3 are fusion-spliced to each other by the fusion splicer (FIG. 5(a)).

Subsequently, the fusion protection sleeve 17 is moved to the position of the fusion-spliced portion S between the embedded fiber 13 and the optical fiber 3. In this state, the fusion protection sleeve 17 is caused to shrink by heating the fusion protection sleeve 17 at about 200° C. (FIG. 5(b)). As a result, the fusion protection sleeve 17 does not move from the position of the fusion-spliced portion S. Then, the jacket 4 and the tensile resistant fibers 5 in the folded back state are returned to their original state (FIG. 5(c)).

Subsequently, a provisionally assembled unit P is prepared. FIG. 7 is an exploded perspective view of the provisionally assembled unit P. The provisionally assembled unit P is a unit in which the frame member 7 and the plug housing 8 are held by a holding member (holding cap 43).

Figure 8:
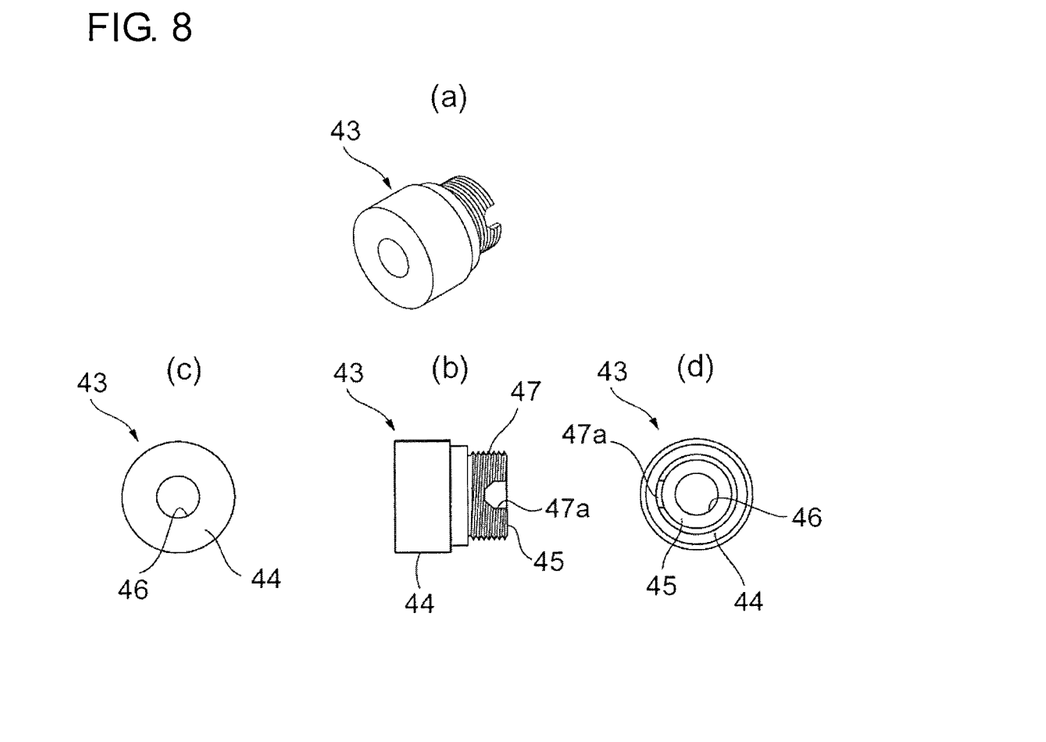
FIG. 8 is a diagram illustrating a holding cap.

FIG. 8 is a diagram illustrating the holding cap 43. The holding cap 43 has a projecting shape in side view (FIG. 8(b)) and includes a main body portion 44 having a cylindrical shape and a small-diameter portion 45 that projects from the main body portion 44 and has a diameter smaller than that of the main body portion 44.

The main body portion 44 and the small-diameter portion 45 have a through hole 46 formed therein. The through hole 46 has an opening diameter that is greater than the outer diameter of the dust cap 18 that holds the ferrule 14 and substantially equal to the outer diameter of the tubular portion 20 of the frame member 7. With this structure, the holding cap 43 holds the frame member 7 when the frame member 7 is inserted in the through hole 46. A male screw 47 is formed on an outer surface of the small-diameter portion 45. A cut portion 47a that engages with the projection 21a on the frame member 7 is formed in a part of the male screw 47.

The plug housing 8 is disposed so as to contain the frame member 7, and the female screw 27 of the plug housing 8 is threadably engaged with the male screw 47 of the holding cap 43. In the provisionally assembled unit P, when the frame member 7 and the plug housing 8 are attached to and held by the holding cap 43, the relative positional relationship between the frame member 7 and the plug housing 8 is maintained such that central axes of the frame member 7 and the plug housing 8 substantially coincide with each other. In other words, the holding cap 43 holds the frame member 7 and the plug housing 8 such that the positional relationship in which the central axes of the frame member 7 and the plug housing 8 substantially coincide with each other is maintained when the frame member 7 and the plug housing 8 are connected to the rear housing 9. The projection 21a on the frame member 7 engages with the cut portion 47a, so that frame member 7 does not rotate with respect to the holding cap 43 while being held by the holding cap 43.

Here, the central axis of the frame member 7 is intended to be an imaginary straight line that passes through the center of the tubular portion 20, which has a substantially cylindrical shape, of the frame member 7 and extends in a longitudinal direction of the tubular portion 20. The central axis of the plug housing 8 is intended to be a straight line that passes through the center of the plug housing 8, which has a substantially cylindrical shape, and extends in a longitudinal direction of the plug housing 8.

Figure 6:
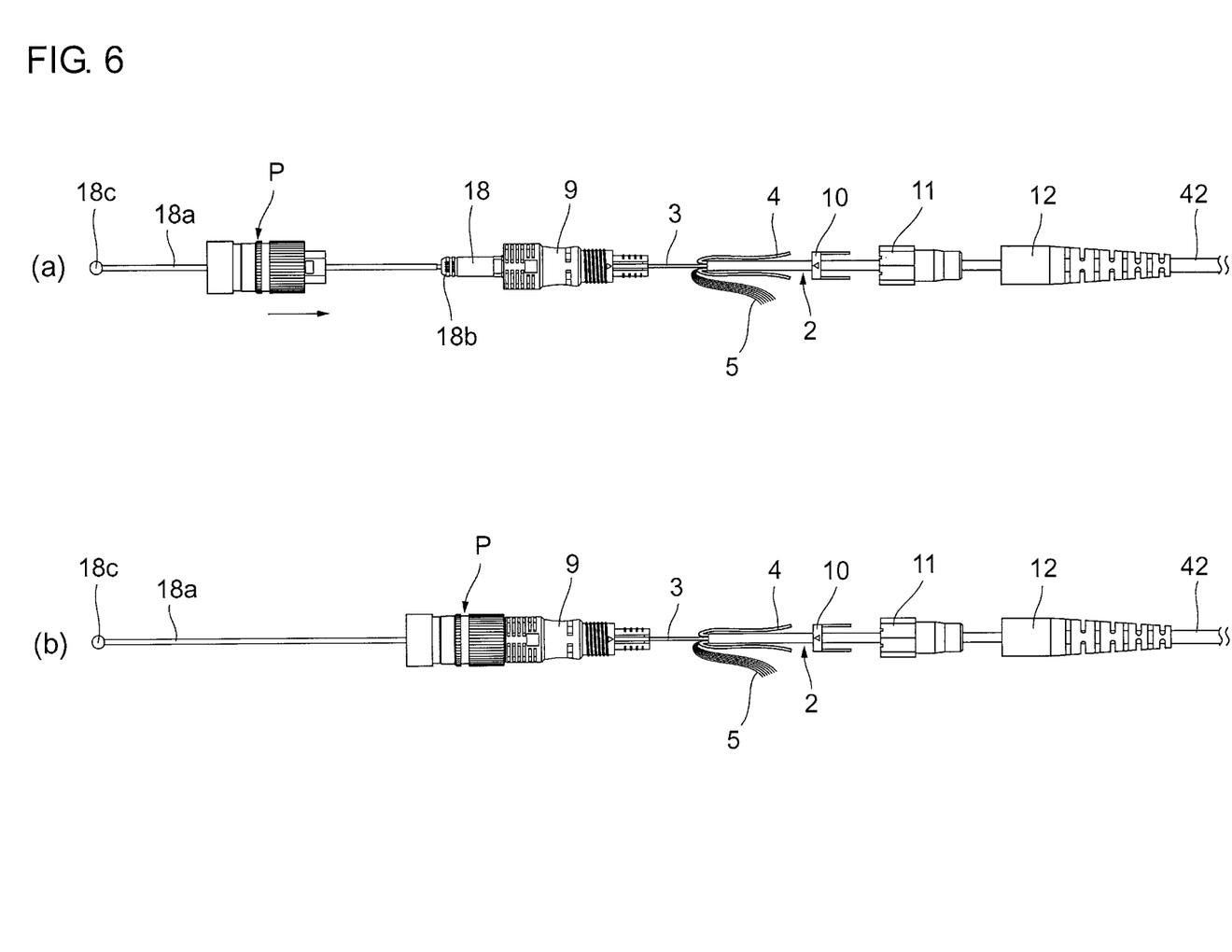
FIG. 6 is a conceptual diagram illustrating the method for assembling an optical connector according to the embodiment of the present invention.

Referring to FIG. 6 again, the dust cap 18 is inserted through the provisionally assembled unit P from a terminal end 18c thereof (FIG. 6(a)). Then, the provisionally assembled unit P is moved toward the rear housing 9 (FIG. 9). Accordingly, the rear housing 9 is inserted into the insertion portion 29 of the plug housing 8, and positioning of the frame member 7 is performed at the same time (FIG. 6(b)). Then, the insertion portion 36 of the rear housing 9 is inserted into the through hole 24 in the frame member 7 and the lug portions of the insertion portion 36 are fitted into the holes 26 in the frame member 7, so that the frame member 7 is fixed to the rear housing 9. As a result, the plug housing 8 is retained between the frame member 7 and the rear housing 9.

Figure 10:
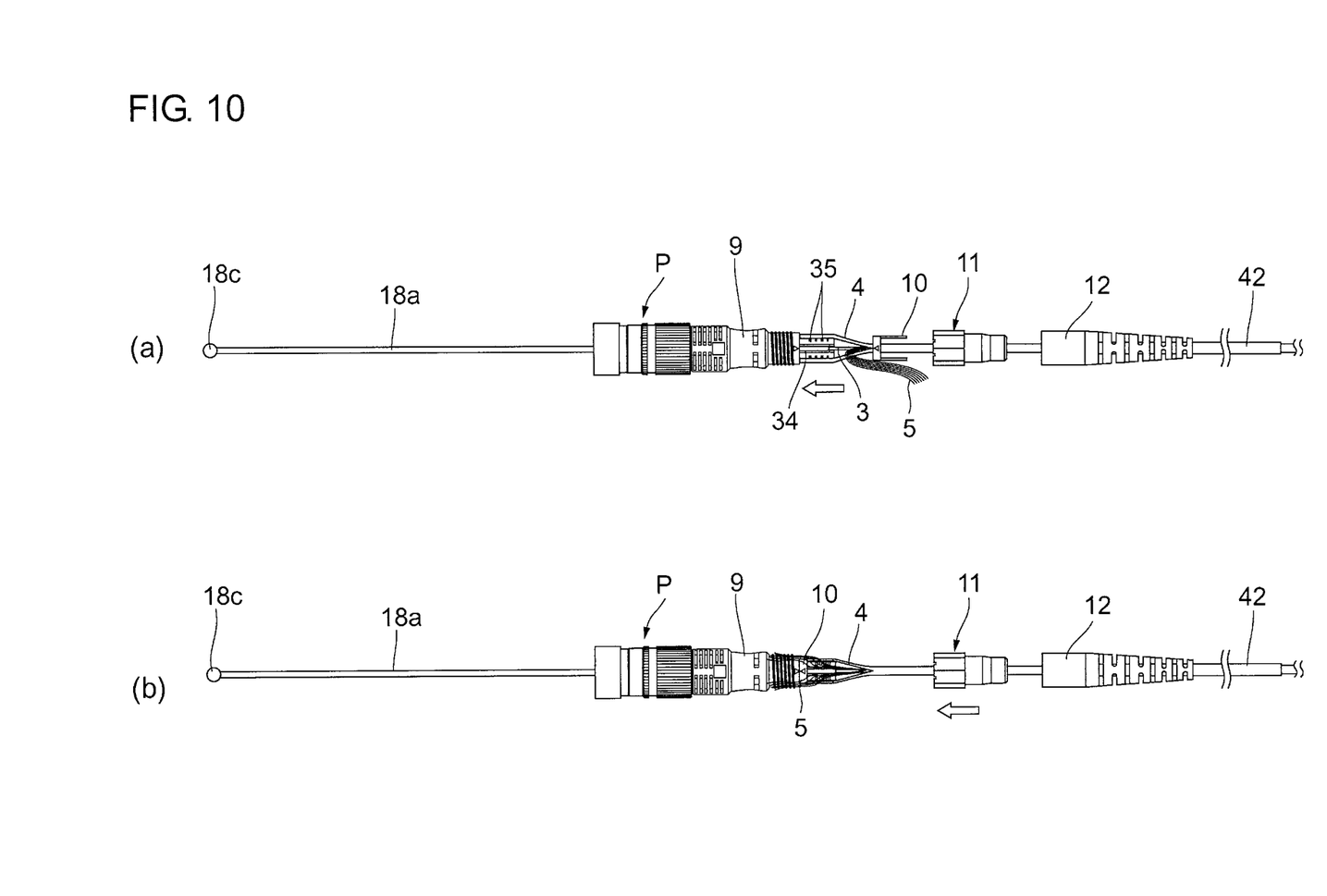
FIG. 10 is a conceptual diagram illustrating the method for assembling an optical connector according to the embodiment of the present invention.

Subsequently, the bifurcated portions of the jacket 4 are placed on the blade portions 35 of the small tubular portion 32 of the rear housing 9 (FIG. 10(a)). Then, the jacket retaining member 10 is fitted to the small tubular portion 32 while the jacket 4 are placed on the blade portions 35 of the small tubular portion 32 of the rear housing 9 (FIG. 10(b)). Accordingly, the blade portions 35 bite into the jacket 4.

Figure 11:
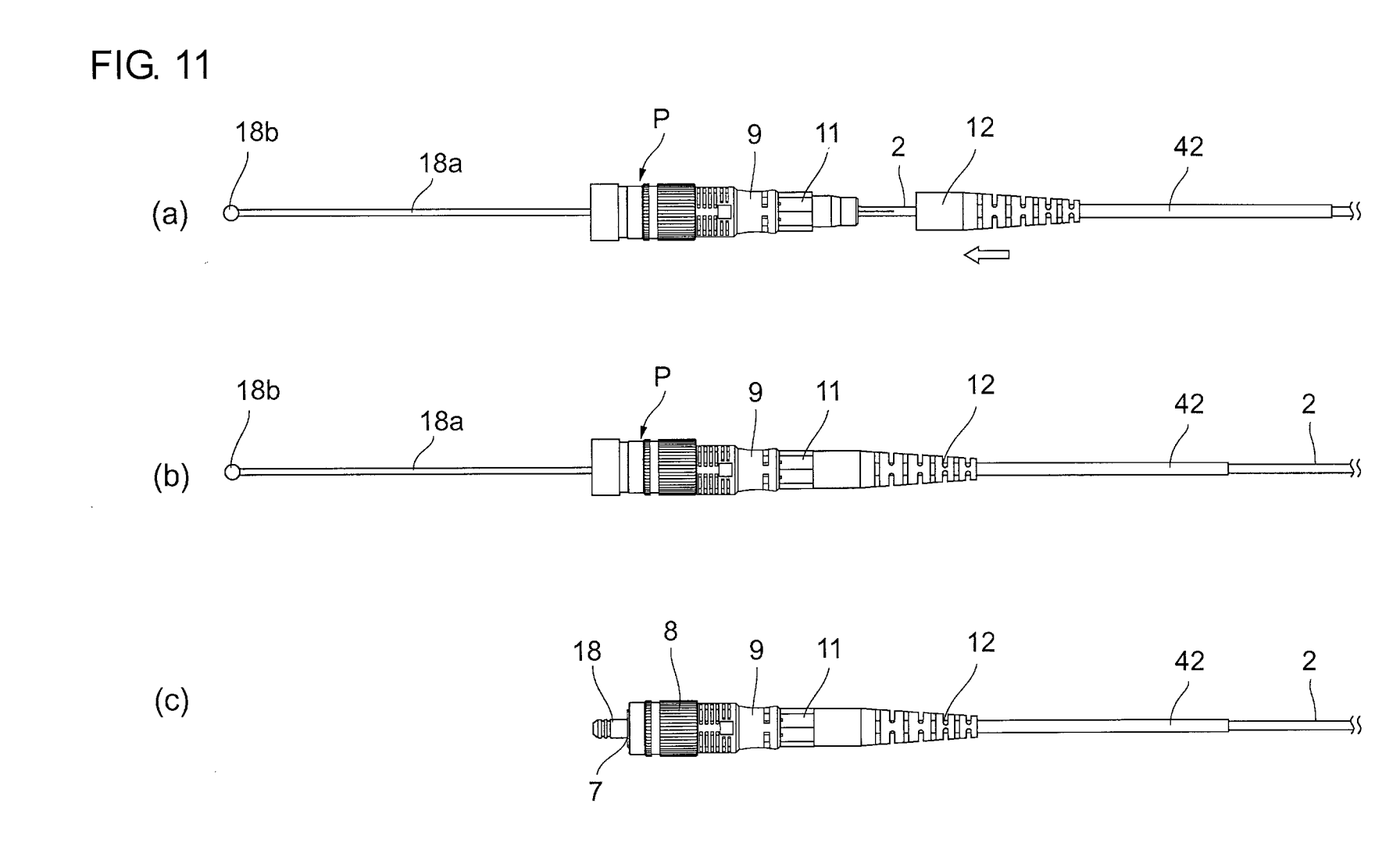
FIG. 11 is a conceptual diagram illustrating the method for assembling an optical connector according to the embodiment of the present invention.

Subsequently, the securing member 11 is screwed onto the large tubular portion 31 of the rear housing 9 while the tensile resistant fibers 5 are placed on the large tubular portion 31 (FIG. 11(a)). Accordingly, the tensile resistant fibers 5 are secured by being sandwiched between the large tubular portion 31 and the tensile-resistant-fiber securing portion 39.

In addition, the small tubular portion 32 of the rear housing 9 is covered by the jacket securing portion 40 of the securing member 11. Since the jacket securing portion 40 has the tapered region 40a in which the thickness of the jacket securing portion 40 decreases toward the rear end of the securing member 11, each of the retaining arms 38 of the jacket retaining member 10 is pushed by the jacket securing portion 40 and bent toward the small tubular portion 32. Accordingly, the bifurcated portions of the jacket 4 are strongly secured by being sandwiched between the jacket securing portion 40 and the small tubular portion 32 with each retaining arm 38.

Subsequently, the boot 12 to which the reinforcing tube 42 is attached is attached to the jacket securing portion 40 of the securing member 11 (FIG. 11(b)). Then, a shaft portion 18a of the dust cap 18 with the shaft is cut with fingers. By performing the above-described steps, the optical connector 1 illustrated in FIG. 1 is completed (FIG. 11(c)).

As described above, in the optical connector 1, the holding cap 43 that holds the frame member 7 and the plug housing 8 while maintaining the relative positional relationship therebetween is used. The ferrule 14 is inserted into the frame member 7 and the plug housing 8 and the rear housing 9 are connected to each other while the frame member 7 and the plug housing 8 are held by the holding cap 43. Accordingly, when the plug housing 8 and the rear housing 9 are connected to each other, positioning of the frame member 7, whose relative positional relationship with the plug housing 8 is maintained, is also performed. In other words, positioning of the frame member 7, which is difficult to attach, can be performed and the frame member 7 can be fixed to the rear housing 9 simply by connecting the plug housing 8, which can be attached more easily than the frame member 7, to the rear housing 9. Therefore, the frame member 7 can be easily assembled to the rear housing 9. As a result, the optical connector 1 can be easily assembled.

Since the ferrule is protected by the protective cap when inserted into the holding member, the ferrule can be prevented from being damaged and dust and the like can be prevented from adhering to the ferrule.

In the case where the optical connector 1 is assembled at a work site, the provisionally assembled unit P is preferably initially packaged in such a manner that the frame member 7 and the plug housing 8 are held by the holding cap 43. In such a case, the optical connector 1 can be more easily assembled.

Figure 12:
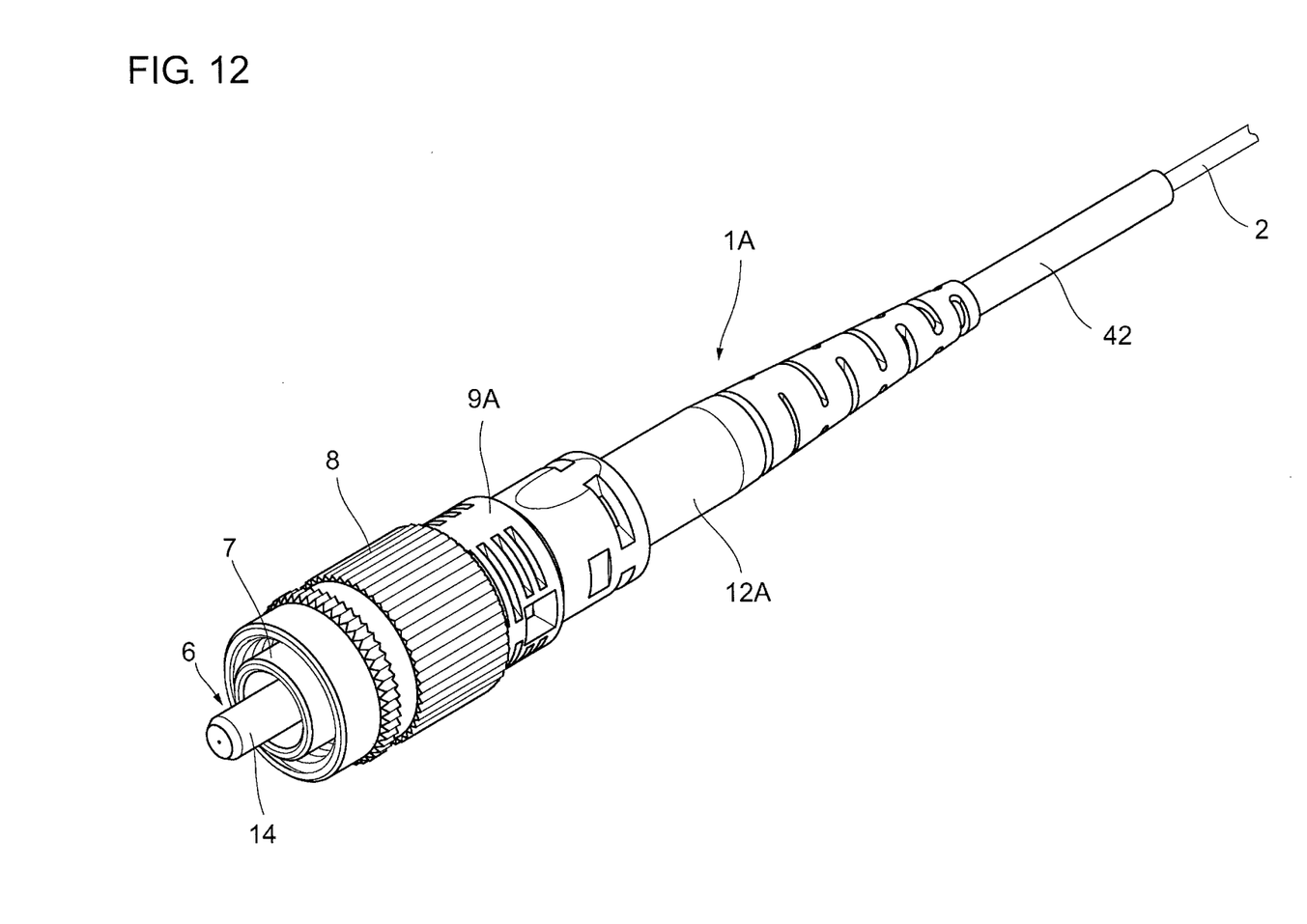
FIG. 12 is a perspective view of another optical connector assembled by a method for connecting an optical connector according to the present invention.
Figure 13:
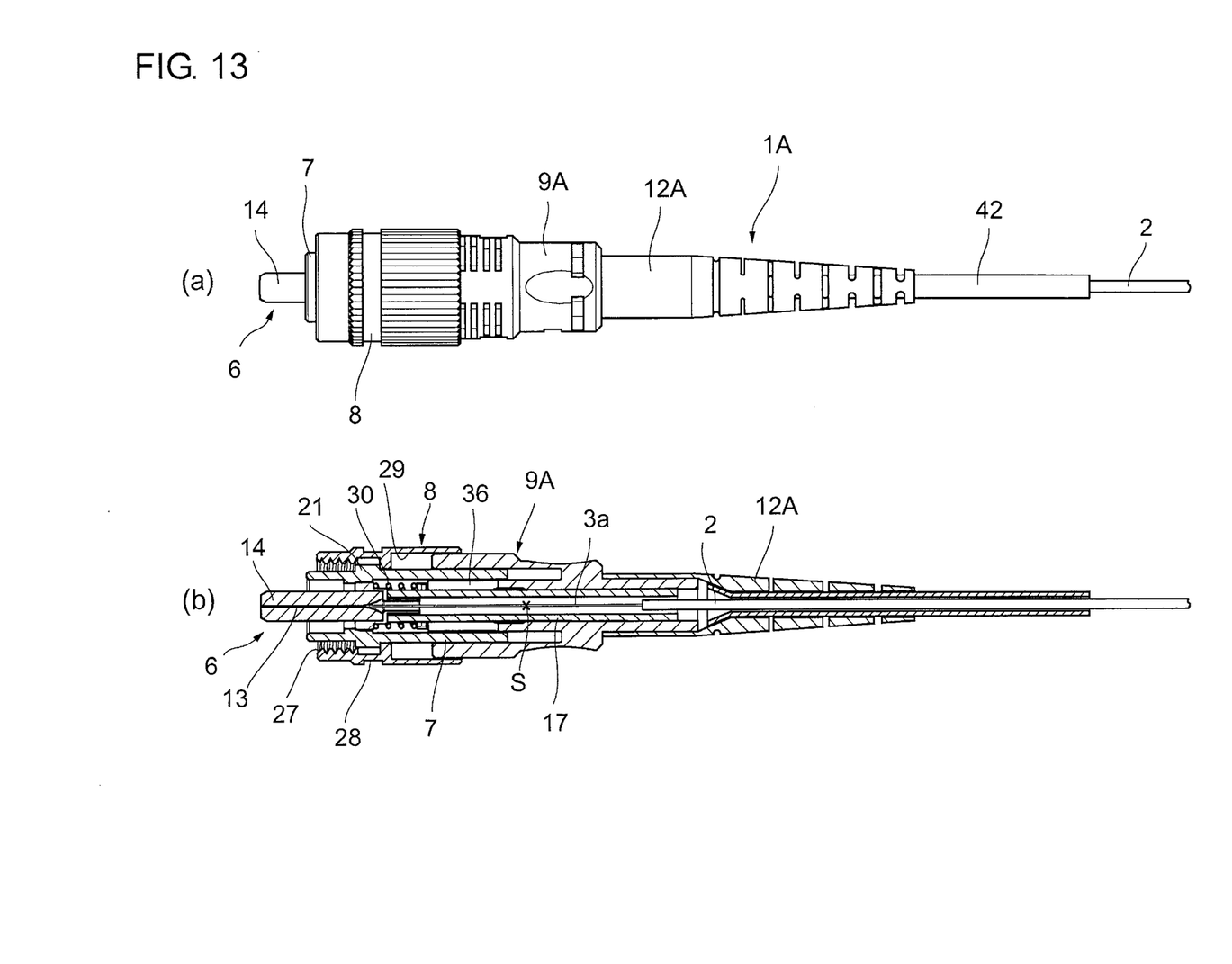
FIG. 13(a) is a side view of the optical connector illustrated in FIG. 12
FIG. 13(b) is a sectional view taken along line b-b in FIG. 13(a).

The present invention is not limited to the above-described embodiment. For example, the optical connector may be a fiber type FC connector. FIG. 12 is a perspective view of a fiber type FC connector 1A assembled by a method for assembling an optical connector according to the present invention. FIG. 13(a) is a side view of the optical connector 1A. FIG. 13(b) is a sectional view taken along line b-b in FIG. 13(a). The optical connector 1A includes a ferrule assembly 6; a frame member 7 that contains the ferrule assembly 6; a plug housing 8 that contains the frame member 7 and that is to be connected to an FC-type adapter; a rear housing 9A that is connected to a rear end of the plug housing 8; and a boot 12A that is attached to the rear housing 9A. The optical connector 1A does not include the rear housing 9, the jacket retaining member 10, and the securing member 11 according to the above-described embodiment.

Also when the optical connector 1A is assembled, similar to the optical connector 1, a holding cap 43 that holds the frame member 7 and the plug housing 8 while maintaining the relative positional relationship therebetween is used. A ferrule 14 is inserted into the frame member 7 and the plug housing 8 and the rear housing 9A are connected to each other while the frame member 7 and the plug housing 8 are held by the holding cap 43. Accordingly, when the plug housing 8 and the rear housing 9A are connected to each other, positioning of the frame member 7, whose relative positional relationship with the plug housing 8 is maintained, is also performed. Therefore, the frame member 7 can be easily assembled to the rear housing 9A. As a result, the optical connector 1A can be easily assembled.

CITATION LIST

Non Patent Literature

NPTL 1: JIS handbook, 22 Electronics II Optoelectronics, first edition, edited and published by Japanese Standards Association, published Jan. 31, 2005, p. 322

Patent Literature

PTL 1: Japanese Unexamined Patent Application Publication No. 2002-82257

The invention claimed is:
1. A method for assembling an optical connector including a ferrule assembly including a ferrule that holds an embedded fiber, comprising:
    a step of connecting the embedded fiber and an optical fiber inserted through a second housing;
    a step of holding a frame member containing the ferrule assembly and a first housing with a holding member while maintaining a relative positional relationship between the frame member and the first housing, the first housing being configured to connect to an adapter, the holding step including inserting the frame member into a through hole formed in the holding member, arranging the first housing to contain the frame member, and threadably engaging the first housing and the holding member; and
    a step of inserting the ferrule into the frame member and connecting the first housing and a second housing to each other while the frame member and the first housing are held by the holding member.
2. The method for assembling the optical connector according to claim 1, wherein,
    in the holding step, the frame member and the first housing are held by the holding member such that central axes of the frame member and the first housing coincide with each other.
3. The method for assembling the optical connector according to claim 2, wherein
    the through hole has an inner diameter that is equal to an outer diameter of a tubular portion of the frame member at a ferrule insertion side, and
    wherein, in the holding step, the frame member is held by the holding member in a slidable manner.
4. The method for assembling the optical connector according to claim 2, further comprising:
    a step of attaching a protective cap to the ferrule,
    wherein, in the step of connecting the first housing and the second housing to each other, the protective cap attached to the ferrule is inserted through the through hole.

* * * * *